United States Patent
Liu

(10) Patent No.: US 7,884,590 B2
(45) Date of Patent: *Feb. 8, 2011

(54) VOLTAGE CONVERTER

(75) Inventor: Yi-Sheng Liu, Hsinchu (TW)

(73) Assignee: Fitipower Integrated Technology, Inc., Miaoli County (TW)

( * ) Notice: Subject to any disclaimer, the term of this patent is extended or adjusted under 35 U.S.C. 154(b) by 241 days.

This patent is subject to a terminal disclaimer.

(21) Appl. No.: 12/168,900

(22) Filed: Jul. 8, 2008

(65) Prior Publication Data

US 2009/0179625 A1 Jul. 16, 2009

(30) Foreign Application Priority Data

Jan. 15, 2008 (CN) .................... 2008 1 0000506

(51) Int. Cl.
*G05F 1/40* (2006.01)
(52) U.S. Cl. .................... 323/282; 323/284; 323/286
(58) Field of Classification Search ................ 323/222, 323/282, 283, 284, 285, 286, 351
See application file for complete search history.

(56) References Cited

U.S. PATENT DOCUMENTS

| 7,034,586 | B2 * | 4/2006 | Mehas et al. ............... 327/143 |
| 7,254,000 | B1 * | 8/2007 | Smith et al. .................... 361/56 |
| 7,385,375 | B2 * | 6/2008 | Rozman ..................... 323/224 |
| 7,629,778 | B2 * | 12/2009 | Liu ............................. 323/222 |
| 7,679,341 | B2 * | 3/2010 | Chen ........................... 323/224 |
| 2004/0150928 | A1 * | 8/2004 | Goodfellow et al. .......... 361/90 |
| 2009/0153127 | A1 * | 6/2009 | Chen ........................... 323/350 |
| 2010/0013452 | A1 * | 1/2010 | Tang et al. ................... 323/282 |

OTHER PUBLICATIONS

Kursun et al, High Input Voltage Step-down DC-DC Converters for Integration in A Low Voltage CMOS Process, Proceedings of 2004 International Symposium on Quality of Electronic Design, Mar. 2004, p. 517-521, IEEE, San Jose, CA, USA.

* cited by examiner

*Primary Examiner*—Adolf Berhane
(74) *Attorney, Agent, or Firm*—Frank R. Niranjan

(57) ABSTRACT

An exemplary voltage converter includes a pulse width modulation controller chip, a pull-up transistor, a pull-down transistor, and a low pass filter. The pulse width modulation controller chip includes a plurality of pins, a power management circuit, a gate control logic circuit, a first gate driver, a second gate driver, a current source, a first resistor, an inductor current sensor, a counter and current step generator, and an oscillator. The plurality of pins include a Vcc pin, a BOOT pin, a PHASE pin, a UGATE pin, a LGATE pin, and a GND pin. The PHASE pin serves as a multi-function pin in the pulse width modulation controller chip. The current source, the first resistor, the inductor current sensor, the counter and current step generator, the oscillator, and the pull-down transistor constitute a light-load efficiency improvement circuit.

6 Claims, 1 Drawing Sheet

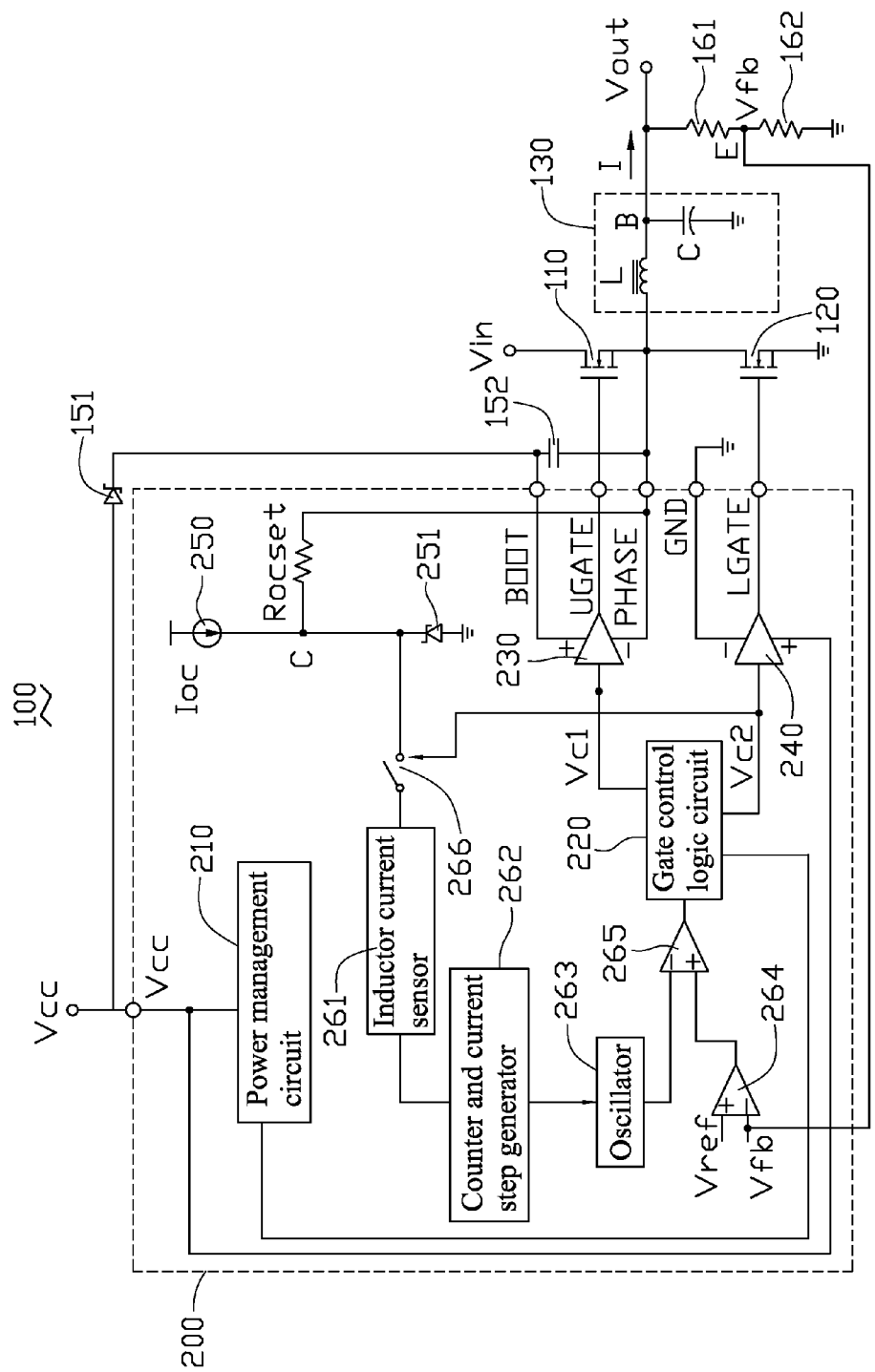

VOLTAGE CONVERTER

BACKGROUND

1. Field of the Invention

The present invention relates to switching power supplies, and particularly to a DC-DC voltage converter with low power loss.

2. Description of Related Art

Direct current to direct current (DC-DC) voltage converters (voltage converter for short) based on a bridge switching circuit are widely used in modern electronic devices, such as computers, mobile phones, etc. A traditional voltage converter utilizes one or more pull-up and pull-down transistors (composing a bridge switching circuit) to produce an alternating current (AC) signal. The AC signal is then applied to a low pass filter composed of an inductor and a capacitor. The low pass filter passes the DC component of the AC signal to the output of the voltage converter to power functional components of an electronic device. Detailed structures and characteristics of the traditional voltage converter are introduced by Volkan Kursun et al., "High Input Voltage Step-down DC-DC Converters for Integration in A Low Voltage CMOS Process", IEEE Proceedings of 2004 International Symposium on Quality of Electronic Design, pp. 517-521, San Jose, Calif., USA, 22-24 Mar. 2004.

For electronic devices, to minimize energy consumption is very important, especially for portable electronic devices. An energy consumption efficiency of the voltage converter of the electronic device in a light load mode decides the standby time of the electronic device. However, the energy consumption efficiency of the voltage converter in the light load mode is high, and the standby time of the electronic device is limited.

Therefore, an improved voltage converter is needed to address the aforementioned deficiency and inadequacies.

SUMMARY

An exemplary voltage converter includes a pulse width modulation controller chip, a pull-up transistor, a pull-down transistor, and a low pass filter. The pulse width modulation controller chip includes a plurality of pins, a power management circuit, a gate control logic circuit, a first gate driver, a second gate driver, a current source, a first resistor, an inductor current sensor, a counter and current step generator, and an oscillator. The plurality of pins include a Vcc pin connected to a first power supply, a BOOT pin connected to the Vcc pin via a diode for receiving power from the first power supply, a PHASE pin connected to the BOOT pin via a capacitor, a UGATE pin, a LGATE pin, and a GND pin that is grounded. The PHASE pin serves as a multi-function pin in the pulse width modulation controller chip. The gate control logic circuit is configured for outputting a first drive signal and a second drive signal that is the inverse of the first drive signal. The current source is connected to a first node that is also connected to the cathode of a zener diode, and the anode of the zener diode is grounded. A terminal of the first resistor is connected to the first node, and the other terminal of the first resistor is connected the PHASE pin. The current source, the first resistor, the inductor current sensor, the counter and current step generator, the oscillator, and the pull-down transistor constitute a light-load efficiency improvement circuit.

Other advantages and novel features of the present invention will become more apparent from the following detailed description of preferred embodiment when taken in conjunction with the accompanying drawings.

BRIEF DESCRIPTION OF THE DRAWINGS

The FIGURE is a circuit diagram of a voltage converter in accordance with an exemplary embodiment.

DETAILED DESCRIPTION OF THE EMBODIMENTS

References will now be made to the drawing to describe exemplary embodiments of the present voltage converter.

Referring to the FIGURE, a voltage converter 100 includes a pulse width modulation (PWM) controller chip 200, a bridge switching circuit composed of a pull-up transistor 110 and a pull-down transistor 120, and a low pass filter 130. The voltage converter 100 is a boost-strap voltage converter.

The PWM controller chip 200 includes a plurality of pins, such as a Vcc pin, a BOOT pin, a UGATE pin, a PHASE pin, a GND pin, and a LGATE pin. The Vcc pin is connected to a first power supply (not shown) for receiving a voltage (also labeled as Vcc). The BOOT pin is connected to the first power supply via a diode 151 for receiving power from the first power supply. In the exemplary embodiment, the diode 151 is a schottky barrier diode. The GND pin is grounded. A capacitor 152 is connected between the BOOT pin and PHASE pin. The PHASE pin is configured to act as a multi-function pin.

The pull-up transistor 110 and the pull-down transistor 120 are connected in series between a second power supply (not shown) and ground. The second power supply is the main power supply of the voltage converter 100, and is configured for supplying a voltage Vin. The pull-up transistor 110 is a common-drain transistor. The pull-down transistor 120 is a common-source transistor. The source of the transistor 110 is connected to the second power supply. The drain of the transistor 110 is connected to the drain of the transistor 120 and the PHASE pin of the chip 200. The gate of the transistor 110 is connected to the UGATE pin of the chip 200. The source of the transistor 120 is grounded, and the gate of the transistor 120 is connected to the LGATE pin of the chip 200.

In the exemplary embodiment, the low pass filter 130 includes an inductor L and a capacitor C. A terminal of the inductor L is connected to the PHASE pin, and another terminal of the inductor L is connected to the anode of the capacitor C. The connection node between the inductor L and the capacitor C is referred to as node B, and is an output terminal, Vout, of the voltage converter 100. The cathode of the capacitor C is grounded. Two resistors 161, 162 are connected in series between the node B and ground. The node between the resistors 161, 162 is referred to as node E for generating a feedback voltage Vfb supplied to a feedback pin (not shown) of the PWM controller chip 200. The feedback voltage Vfb is in direct ratio to the output voltage Vout of the voltage converter 100.

The PWM controller chip 200 includes a power management circuit 210, a gate control logic circuit 220, a first gate driver 230, a second gate driver 240, a current source 250, a resistor Rocset, an inductor current sensor 261, a counter and current step generator (generator for short) 262, an oscillator 263, a first comparator 264, and a second comparator 265.

An input terminal of the power management circuit 210 is connected to the first power supply for receiving the voltage Vcc. An output terminal of the power management circuit 210 is connected to the gate control logic circuit 220. The power management circuit 210 is configured for generating and transmitting a power-on reset signal to the gate control logic circuit 220 when the PWM controller chip 200 is enabled. In the exemplary embodiment, the power management circuit 210 may be a power-on reset circuit 220.

A first output terminal of the gate control logic circuit 220 is configured for for outputting a first drive signal Vc1 to the input of the first gate driver 230. A second output terminal of the gate control logic circuit 220 is configured for outputting a second drive signal Vc2 to the input of the second gate driver 240. The first and second drive signals Vc1, Vc2 are the inverse of each other. That is, at any time, only one of the first and second drive signals Vc1, Vc2 is high/low.

The positive power supply terminal of the first gate driver 230 is connected to the BOOT pin for receiving power from the first power supply through the diode 151. The negative power supply terminal of the first gate driver 230 is connected to the PHASE pin. The output terminal of the first gate driver 230 is connected to the UGATE pin for outputting a third drive signal to the transistor 110. The positive power supply terminal of the second gate driver 240 is connected to the Vcc pin. The negative power supply terminal of the second gate driver 240 is connected to the GND pin. The output terminal of the second gate driver 240 is connected to the LGATE pin for outputting a fourth drive signal to the transistor 120. In the exemplary embodiment, the first and second gate drivers 230, 240 are unity gain buffer amplifiers. Thus, the voltages and waveforms of the third and fourth drive signals are the same as the voltages and waveforms of the first and second drive signals Vc1, Vc2, respectively. The third and fourth drive signals are the inverse of each other.

In operation, when the gate control logic circuit 220 receives power-on reset signal from the power management circuit 210, the gate control logic circuit 220 starts to operate and outputs the first and second drive signals Vc1, Vc2 to the first and second gate drivers 240, 250, respectively. The first and second gate drivers 240, 250 then output the third and fourth drive signals, respectively. Because the third and fourth drive signals are the inverse of each other, at any time, when one of the transistors 110, 120 is turned on, the other is turned off. Therefore, voltage pulses swinging between ground potential and the voltage Vin are generated at PHASE pin to charge and discharge the capacitor C through the inductor L. Accordingly, a direct current (DC) output voltage Vout and a DC output current I are generated.

The current source 250 is connected to a node C that is connected to the cathode of a zener diode 251. The anode of the zener diode 251 is grounded. A terminal of the resistor Rocset is connected to the node C, another terminal of the resistor Rocset is connected to the PHASE pin.

The input terminal of the inductor current sensor 261 is connected to the node C via a switch 266 to indirectly detect the voltage at the PHASE pin. The output terminal of the inductor current sensor 261 is connected to the input terminal of the generator 262. The output terminal of the generator 262 is connected to the input terminal of the oscillator 263 whose output terminal is connected to the inverting input terminal of the second comparator 265. The non-inverting input terminal of the second comparator 265 is connected to the output terminal of the first comparator 264. The output terminal of the second comparator 265 is connected to the gate control logic circuit 220.

The inverting input terminal of the first comparator 264 is connected to the node E for receiving the feedback voltage Vfb. A reference voltage Vref is applied to the non-inverting input terminal of the first comparator 264. In other embodiments, the inverting input terminal of the first comparator 264 could be directly connected to the output terminal of the voltage converter 100 for receiving the output voltage Vout.

The control terminal of the switch 266 is connected to the second output terminal of the gate control logic circuit 220. Thus, the switch 266 is controlled by the second drive signal Vc2, so is the transistor 120. When the transistor 120 is turned on, the switch 266 is closed to connect the input terminal of the inductor current sensor 261 to the node C. Therefore, the inductor current sensor 261 and the transistor 120 operate synchronously.

The inductor current sensor 261, the generator 262, the oscillator 263, the first and second comparator 264, 265, the resistor Rocset, the transistor 120, and the current source 250 cooperatively constitute a light-load efficiency improvement circuit for reducing energy consumption of the voltage converter 100 in a discontinuous current mode (DCM).

The light-load efficiency improvement circuit behaves in the following manner. When the transistor 120 turns on, the transistor 120, the current source 250, and the resistor Rocset form a loop, the current flowing through the node C equals to a current flowing through the PHASE pin. Also, when the transistor 120 turns on, the switch 266 is closed, the inductor current sensor 261 detects the current flowing through the node C, and correspondingly outputs a control signal to indicate the amount of the current. The generator 262 determines whether the voltage converter 100 is in the DCM mode in response to the control signal.

When the generator 262 detects that the current flowing through the node C is continuously a light-load current, this would mean that the voltage converter 100 is in the DCM mode. The generator 262 outputs a current to the oscillator 262 to reduce a frequency generated by the oscillator 262. In response to the reduced frequency, the gate control logic circuit 220 reduces the frequencies of the first and second drive signals Vc1, Vc2. Therefore, the switching frequencies of the transistors 110, 120 are correspondingly reduced. As a result, energy loss due to the switching of the transistors 110 and 120 is reduced in the DCM mode, and energy consumption efficiency of the voltage converter 100 is also decreased. Accordingly, the standby time of the voltage converter 100 is prolonged.

Furthermore, when performing the light-load efficiency improvement function, the light-load efficiency improvement circuit detects whether the voltage converter 100 is in the DCM mode by detecting the current flowing through the PHASE pin. That is, the PHASE pin can be employed as a multi-function pin that can facilitate (provide) the light-load efficiency improvement function, thus an extra pin used to perform the light-load efficiency improvement function is not required and omitted. Therefore a size of the voltage converter 100 can be minimized, and a cost for packaging of the PWM controller chip 200 is saved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A voltage converter, comprising:
 a pulse width modulation controller chip comprising:
  a plurality of pins, the plurality of pins comprise a Vcc pin connected to a first power supply, a BOOT pin connected to the Vcc pin via a diode for receiving power from the first power supply, a PHASE pin acting as a multi-function pin and connected to the BOOT pin via a capacitor, a UGATE pin, a LGATE pin, and a GND pin that is grounded;

a gate control logic circuit for outputting a first drive signal and a second drive signal that is the inverse of the first drive signal;

a power management circuit for generating a power-on reset signal to enable the gate control logic circuit when the pulse width modulation controller chip is enabled;

a first gate driver comprising an input terminal for receiving the first drive signal, a positive power supply terminal connected to the BOOT pin, a negative power supply terminal connected to the PHASE pin, and an output terminal for outputting a third drive signal corresponding to the first drive signal;

a second gate driver comprising an input terminal for receiving the second drive signal, a positive power supply terminal connected to the Vcc pin, a negative power supply terminal connected to the GND pin, and an output terminal for outputting a fourth drive signal corresponding to the second drive signal, the fourth drive signal is the inverse of the third drive signal;

a current source connected to a first node which is also connected to the cathode of a zener diode, and the anode of the zener diode is grounded;

a first resistor with one terminal connected to the first node, and the other terminal connected the PHASE pin;

an inductor current sensor for detecting a first current flowing through the first node;

a counter and current step generator for generating a control signal when the voltage converter is in a discontinuous current mode according to the first current; and an oscillator for reducing a frequency outputted to signal the gate control logic circuit to reduce frequencies of the first and second drive signal in response to the control signal;

a pull-up transistor comprising a gate connected to the UGATE pin for receiving the third drive signal, a source connected to a second power supply, and a drain connected to the PHASE pin;

a pull-down transistor comprising a drain connected to the PHASE pin, a gate connected to the LGATE pin for receiving the fourth drive signal, and a source that is grounded; and a low pass filter comprising an input terminal connected to the PHASE pin, and an output terminal serving as an output terminal of the voltage converter;

wherein the gate control logic circuit generates the first and second drive signals for the first and second gate driver to respectively switch on or off the pull-up transistor and the pull-down transistor.

2. The voltage converter as described in claim 1, further comprising a first comparator and a second comparator, a feedback voltage of the voltage converter is applied to an inverting input terminal of the first comparator, a third reference voltage is applied to the non-inverting input terminal of the first comparator, an output terminal of the first comparator is connected to a non-inverting input terminal of the second comparator, an inverting input terminal of the second comparator is connected to an output terminal of the oscillator, and the output terminal of the second comparator is connected to the gate control logic circuit.

3. The voltage converter as claimed in claim 2, wherein the feedback voltage equals to the output voltage of the voltage converter.

4. The voltage converter as claimed in claim 2, further comprising a second resistor and a third resistor connected in series between the output terminal of the voltage converter and ground, a node between the second and third resistors provides the feedback voltage for the first comparator.

5. The voltage converter as described in claim 1, further comprising a switch connected between the inductor current sensor and the first node, the switch is controlled by the second drive signal, so that the inductor current sensor and the pull-down transistor operate synchronously.

6. The voltage converter as described in claim 1, wherein the low pass filter comprises an inductor and a capacitor, a terminal of the inductor is connected to the PHASE pin, another terminal of the inductor serves as the output terminal of the voltage converter, and is connected to the anode of the capacitor C, and the cathode of the capacitor is grounded.

* * * * *